[19] United States Patent
Choudary et al.

[11] Patent Number: 6,030,916
[45] Date of Patent: Feb. 29, 2000

[54] PROCESS FOR THE PREPARATION OF A MOLECULAR SIEVE ADSORBENT FOR SELECTIVELY ADSORBING NITROGEN FROM A GASEOUS MIXTURE

[75] Inventors: Nettem Venkateshwarlu Choudary; Raksh Vir Jasra; Sodankoor Garadi Thirumaleshwar Bhat, all of Gujarat, India

[73] Assignee: Indian Petrochemicals Corp. Ltd., Gujarat, India

[21] Appl. No.: 09/037,147

[22] Filed: Mar. 9, 1998

[30] Foreign Application Priority Data

Mar. 10, 1997 [IN] India ................ 151/BOM/97

[51] Int. Cl.⁷ .................................. B01J 29/06
[52] U.S. Cl. ................ 502/65; 502/62; 502/64; 502/68; 502/73; 502/79
[58] Field of Search ................ 502/62, 64, 65, 502/68, 73, 79; 95/130, 902

[56] References Cited

U.S. PATENT DOCUMENTS

| | | | |
|---|---|---|---|
| 4,259,299 | 3/1981 | Hagiwara et al. | 423/210 |
| 4,631,267 | 12/1986 | Lachman et al. | 502/439 |
| 4,793,827 | 12/1988 | Lochow et al. | 502/65 |
| 4,822,492 | 4/1989 | Chao et al. | 210/679 |
| 5,104,425 | 4/1992 | Rao et al. | 55/16 |
| 5,190,902 | 3/1993 | Demmel | 502/63 |
| 5,200,377 | 4/1993 | Zones et al. | 502/62 |
| 5,202,014 | 4/1993 | Zones et al. | 208/46 |
| 5,215,648 | 6/1993 | Zones et al. | 208/46 |
| 5,387,564 | 2/1995 | Takeuchi et al. | 502/62 |
| 5,633,217 | 5/1997 | Lynn | 502/439 |
| 5,696,043 | 12/1997 | Tissler | 502/64 |

*Primary Examiner*—Thomas Dunn
*Attorney, Agent, or Firm*—Ladas & Parry

[57] ABSTRACT

This invention relates to the manufacture of novel molecular sieve adsorbents useful for the separation of a gaseous mixture of oxygen and nitrogen. The adsorbent is useful for the separation of oxygen and/or nitrogen from air. More particularly, the invention relates to the manufacture of a molecular sieve adsorbent which is selective towards nitrogen from its gaseous mixture with oxygen and/or an inert gas such as argon or helium.

13 Claims, 4 Drawing Sheets

Chromatogram of mixture of nitrogen and oxygen on LiYXE

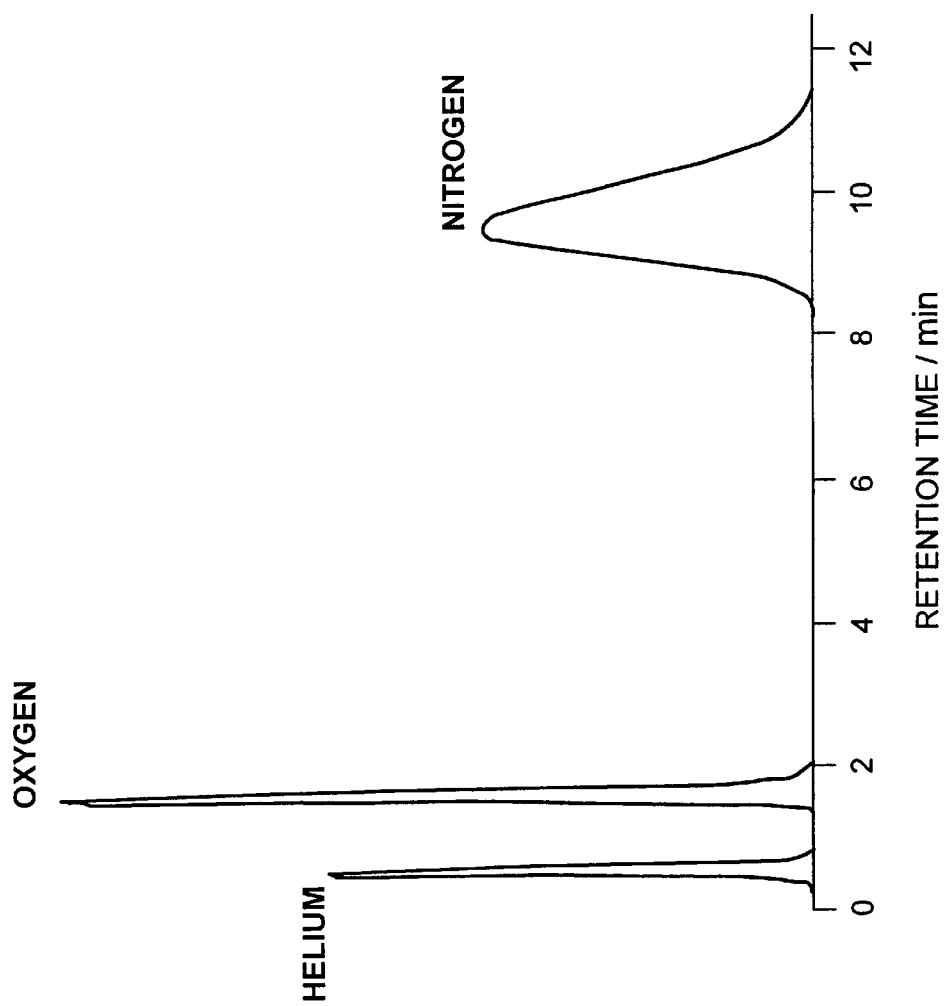

PROCESS FOR THE PREPARATION OF A MOLECULAR SIEVE ADSORBENT FOR SELECTIVELY ADSORBING NITROGEN FROM A GASEOUS MIXTURE

This invention relates to the manufacture of a molecular sieve adsorbent which is selective towards nitrogen from its gaseous mixture with oxygen and/or an inert gas such as argon or helium. More particularly, this invention relates to the manufacture of novel molecular sieve adsorbents useful for the separation of a gaseous mixture of oxygen and nitrogen. The adsorbent is useful for the separation of oxygen and/or nitrogen from air.

BACKGROUND OF THE INVENTION

Adsorption processes for the separation of oxygen and nitrogen from air are being increasingly used for commercial purposes for the last two decades. Oxygen requirements in sewage treatment, fermentation, cutting and welding, fish breeding, electric furnaces, pulp bleaching, glass blowing, medical purposes and in the steel industries particularly when the required oxygen purity is 90 to 94% is being largely met by adsorption based pressure swing or vacuum swing processes. It is estimated that at present, 4–5% of the world's oxygen demand is met by adsorptive separation of air. However, the maximum attainable oxygen purity by adsorption processes is around 95% with separation of 0.934 mole percent argon present in the air from oxygen being a limiting factor to achieve 100% oxygen purity. Furthermore, the adsorption based production of oxygen from air is economically not competitive to cryogenic fractionation of air for production levels of more than 100 tonnes oxygen per day. Of the total cost of oxygen production by adsorption processes, it is estimated that capital cost of equipment and power consumption are the two major factors influencing the overall cost with their share being 50% and 40% respectively. Besides the other factors like process and system designs, the adsorbent is the key component which can bring down the cost of oxygen production by adsorption. The adsorbent selectivity and capacity are important parameters for determining the size of adsorption vessels, compressors or vacuum pumps. It is desirable to have an adsorbent which shows a high adsorption capacity as well as selectivity for nitrogen compared to oxygen. The improvement in these properties of the adsorbent directly results in lowering the adsorbent inventory of a system along with the size and power consumption of the air compressor or vacuum pump. Furthermore, adsorbent having a high nitrogen adsorption selectivity and capacity can also be used to produce reasonably pure nitrogen along with oxygen by evacuating nitrogen adsorbed on the adsorbent.

It is therefore, highly desirable, if not absolutely essential, for an adsorbent to have a good adsorption capacity and adsorption selectivity for a particular component sought to be separated.

Adsorption capacity of the adsorbent is defined as the amount in terms of volume or weight of the desired component adsorbed per unit volume or weight of the adsorbent. The higher the adsorbent's capacity for the desired components the better is the adsorbent as the increased adsorption capacity of a particular adsorbent helps to reduce the amount of adsorbent required to separate a specific amount of a component from a mixture of particular concentration. Such a reduction in adsorbent quantity in a specific adsorption process brings down the cost of a separation process.

Adsorption selectivity of component A over B is defined as $$\alpha A/B = X_A Y_B / Y_A X_B$$

where is the adsorption selectivity, X is the adsorbed concentration and Y is gas-phase concentration respectively. The expression gas-phase concentraction means the amount of unadsorbed component remaining in the gas-phase. The adsorption selectivity of a component depends on steric factors such as differences in the shape and size of the adsorbate molecules;

equilibrium effect, i.e. when the adsorption isotherms of the component of the gas mixture differ appreciably;

kinetic effect, when the components have substantially different adsorption rates.

It is generally observed that for a process to be commercially economical, the minimum acceptable adsorption selectivity for the desired component is about 3 and when the adsorption selectivity is less than 2, it is difficult to design an efficient separation process.

In the prior art, adsorbents which are selective for nitrogen from its mixture with oxygen and argon have been reported wherein the zeolites of type A, X and mordenite have been used after ion exchanging with alkali and/or alkaline earth metal ions. However, the adsorption selectivity reported for the commercially used adsorbents for this purpose varies from around 3 to 5. The efforts to enhance the adsorption capacity and selectivity has been reported by increasing the number of exchangeable cations into the zeolite structure by modifying the chemical composition of the zeolite (Reference Coe Si/Al ratio). The adsorption selectivity for nitrogen has also been substantially enhanced by exchanging the zeolite with cations like lithium and/or calcium in some zeolite types. In the present invention, we report a new chemical composition using faujasite type zeolite having alkali, alkaline or rare earth metal ions which give substantially high nitrogen adsorption capacity and selectivity compared to commercially employed adsorbents for oxygen production from air.

Zeolites which are microporous crystalline aluminosilicates are finding increased applications as adsorbents for separating mixtures of closely related compounds. Zeolites have a three dimensional network of basic structural units consisting $SiO_4$ and $AlO_4$ tetrahedral linked to each other by sharing of apical oxygen atoms. Silicon and aluminum atoms lie at the center of the tetrahedral. The resulting aluminosilicate structure which is generally highly porous possesses three dimensional pores the access to which is through molecular sized windows. In a hydrated form, the preferred zeolites are generally represented by the following Formula [I]

$$M_{2/n}O:Al_2O_3:xSiO_2:wH_2O \quad (I)$$

where "M" is a cation which balances the electrovalence of the tetrahedral and is generally referred to as extra framework exchangeable cation, n represents the valency of the cation, x and w represent the moles of $SiO_2$ and water respectively. The cations may be any one of the number of cations which will hereinafter be described in detail.

The attributes which make the zeolites attractive for separation include, an unusually high thermal and hydrothermal stability, uniform pore structure, easy pore aperture modification and substantial adsorption capacity even at low adsorbate pressures. Furthermore, zeolites can be produced synthetically under relatively moderate hydrothermal conditions.

Zeolite of type X structure as described and defined in U.S. Pat. No. 2,882,244 are the preferred adsorbents for adsorption separation of the gaseous mixture described in this invention. Zeolite of type X in hydrated or partially hydrated form can be described in terms of metal oxide of the Formula II.

$$(0.9+/-0.2)M_{2/n}O:Al_2O_3:(2.5+/-0.5)SiO_2:wH_2O \qquad (II)$$

where "M" represents at least one cation having valence n, w represents the number of moles of water the value of which depends on the degree of hydration of the zeolite. Normally, the zeolite when synthesized has sodium as exchangeable cations.

Powdered zeolites as such have very little cohesion and it is, therefore, necessary to use appropriate binders to produce the adsorbent in the form of particles such as extrudates, aggregates, spheres or granules to suit commercial applications. Zeolitic content of the adsorbent particle vary from 60 wt % to 98 wt % depending on the type of binder used. Clays such as bentonite, kaolin, and attapulgite are normally used inorganic binders for agglomeration of zeolite powders.

SUMMARY OF THE INVENTION

It is an object of the present invention to provide an adsorbent composition which can be used for the separation of oxygen-nitrogen and/or nitrogen-argon gaseous mixture.

Yet another object of this invention is to provide a nitrogen selective adsorbent based on synthetic zeolites.

Yet another object of this invention is to provide a nitrogen selective adsorbent by modification of surface characteristics of synthetic zeolites.

Yet another object of the present invention is to provide an adsorbent with increased adsorption selectivity and capacity for nitrogen from its mixture with oxygen and/or argon.

Yet another object of the present invention is to provide nitrogen selective adsorbents which can be used commercially.

BRIEF DESCRIPTION OF THE FIGURES

FIG. 4 is a chromatogram of mixture of nitrogen and oxygen on CaYXE.

DESCRIPTION OF THE INVENTION

Figure 1:
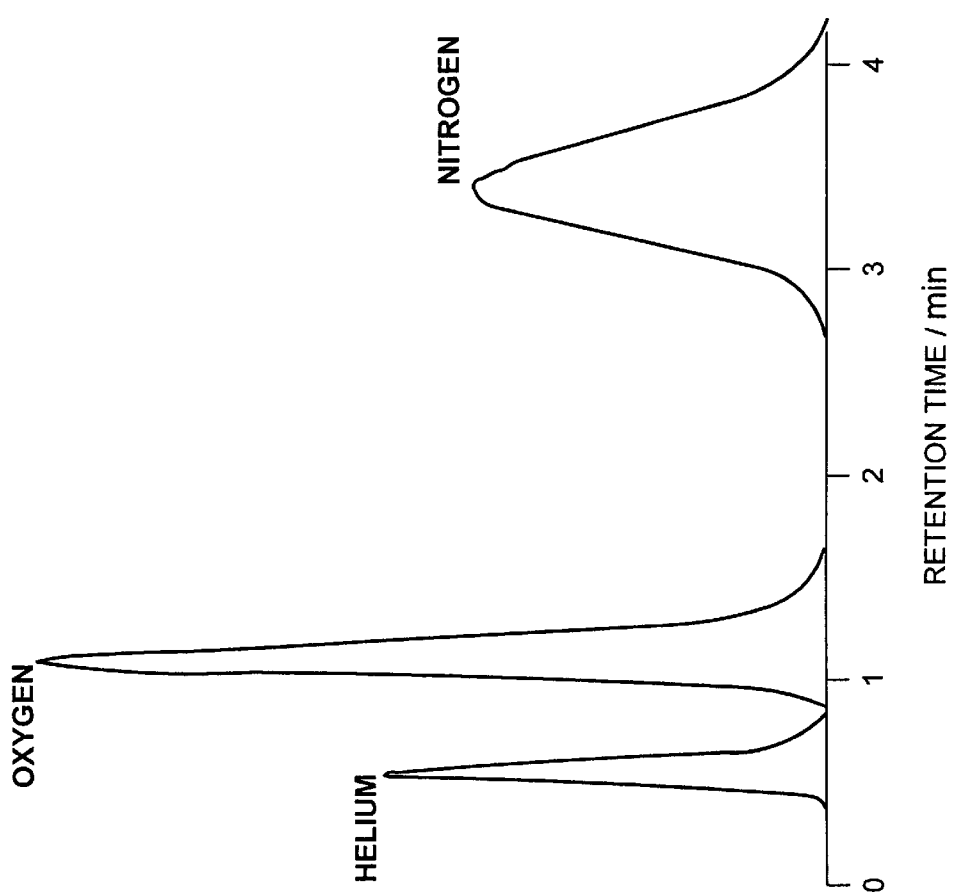
FIG. 1 is a chromatogram of mixture of nitrogen and oxygen on YXP-1.

According to the present invention, there is provided a molecular sieve adsorbent having a composition $$a.M_2O:b.Y_2O_3:Al_2O_3:c.SiO_2:w.H_2O$$

where the values of
a is from 0.0 to 0.70;
b is from 0.0 to 0.33;
c is from 2.0 to 5.5;
M is an alkali or alkaline earth metal ion such as lithium, sodium or calcium and w is the number of moles of water.

The adsorbent of the present invention can be conveniently obtained by: (i) preparing a mixture of zeolite powder type X as described in U.S. Pat. No. 2,882,244 or zeolite Y as described in U.S. Pat. No. 3,130,007 with a clay such as herein described and an organic binder such as herein described, (ii) forming adsorbent bodies of desired shape or subjecting the adsorbent powder to cation exchange with one or more cations and then forming adsorbent bodies, (iii) subjecting the adsorbent bodies so formed to calcination (iv) subjecting the calcined adsorbent bodies to cation exchange with one or more cations if the cation exchange has not been done in step (ii).

The present invention employs the technique of modification of the surface properties of the adsorbent bodies by cation exchange with one or more cations to obtain a nitrogen selective adsorbent from its gaseous mixture with oxygen and/or argon and/or helium.

The modification of the surface property hereinafter referred to as surface modification is the most critical and important aspect of the invention. It is a very specific surface modification which renders the zeolite particularly selective towards nitrogen. It has been surprisingly found that conventional zeolite particularly, zeolite X is subjected to surface modification with treatment with a rare earth salt solution, specifically of an alkali metal salt solution specifically yttrium or combination of yttrium with lithium and/or calcium, the zeolite becomes selective for nitrogen.

Accordingly, the present invention provides, a process for the preparation of a molecular sieve adsorbent for selectively adsorbing nitrogen from a gaseous mixture consisting of nitrogen, oxygen and/or an inert gas said process comprising:

(a) preparing in any known manner a mixture of zeolite powder with conventional clay and organic binder;

(b) shaping said zeolite mixture to obtain adsorbent bodies of desired shape;

(c) subjecting adsorbent bodies to calcination; and (d) subjecting said adsorbent bodies either prior to or after calcination or both, to cationic exchange in the presence of at least a rare earth salt solution such as hereinbefore described to effect surface modification of said adsorbent bodies to obtain said molecular sieve adsorbent which is nitrogen selective.

While the aforesaid surface modification may be carried out at a wide range of temperature and concentration, excellent results are obtained if the surface modification supply is carried out with 1 to 10% by weight of the aqueous solution at a temperature of 30 to 100° C. for 4 to 48 hrs.

The adsorbent bodies are prepared from a mixture of zeolite of type X and clay powder with an addition of an organic binder like sodium lignosulfonate or starch or polyvinyl alcohol. Bentonite type clay preferably about 2 to 40% by weight is normally used for aggregation of zeolite powder. As the clay remains as an inert component in the adsorbent body and do not display any adsorption properties, the adsorption capacity and selectivity of the adsorbent body decreases in proportion to the amount of the clay added in the body.

In a typical process for producing adsorbent pellets, zeolite powder of type X or type Y was mixed with desired quantity of clay. A known quantity of an organic binder like sodium lignosulfonate was added to this mixture which was then subjected to ball milling for some specified period to have powder particles less than 60 microns. The powder thus obtained was formed into bodies using a pan granulator or an extruder. The particles prepared by the above described method were first dried in air followed by oven drying at 110° C. The dried particles were subjected to air calcination at 450 to 700° C. for 2 to 18 hours.

The adsorbent particles were then treated with an aqueous solution of alkali, alkaline earth and/or rare earth metal cation or a combination of these at a specified concentration (1 to 10% by weight) at 30–100° C. for 4 to 48 hours followed by a thorough wash with hot water. The particles were then dried at 110° C. in an air oven for 8 to 18 hours.

The quantity of exchangeable cations in the adsorbent particles after the above treatment is determined by digesting the known amount of adsorbent particles in hot hydrochloric acid and then making the aqueous solution. The quantitative estimation of the cations in the aliquot solution is done by Atomic Absorption Spectroscopic measurement.

The loss of crystallinity in the adsorbent particles, if any, was checked by comparing the X-ray diffraction data with literature X-ray data. The X-ray diffractions at 'd" values 14.465, 8.845. 7.538, 5.731, 4.811, 4.419, 3.946, 3.808, 3.765, 3.338, 3.051, 2.944, 2.885, 2.794 and 2.743 Å were used for comparison. Water adsorption capacity data on the above treated adsorbent particles were also compared with a standard zeolite NaX. Water adsorption capacity was measured using a Mcbain-Bakr Quartz spring balance.

Oxygen/Nitrogen/Argon Adsorption capacity and selectivity were measured by elution chromatography. In this technique, the adsorbent sample was ground and sieved to obtain 60–80 mesh particles and packed in a thoroughly cleaned 6×600 mm stainless steel column which was placed in an oven of a gas chromatography. In those cases where starting material was zeolite powder, it was first pressed in to pellets in a hydraulic press to obtain compact particles and then ground and sieved to obtain 60–80 mesh particles. The adsorbent was activated by subjecting it to a programmed heating from ambient to 400° C. at the heating rate of 2° C./minute and held at 400° C. for 12 hours with the flow of 60 ml/minute of ultra-high purity hydrogen. Alter the activation, the column temperature was brought down to ambient temperature and the hydrogen gas flow was reduced to 30 ml/minute. A 0.5 mL pulse of gas mixture consisting of nitrogen, oxygen and helium (or argon and helium) in hydrogen was injected into the adsorbent column using a sampling valve, and the retention times of gases measured. The procedure was repeated at 40, 50 and 60° C. The column was equilibrated for at least 1 hour at each temperature before injecting the gas mixture. The corrected retention times were obtained by subtracting the helium retention time from those of nitrogen, oxygen and argon.

The corrected retention time was used to determine the Henry constant (i.e. a measure of equilibrium adsorption capacity of an adsorbent for a particular component), adsorption selectivity and heats of adsorption of oxygen and argon employing standard formulae described below:

Henry constant, $K/mmol.g^{-1}.kPa^{-1} = V_N/RT$ where R is gas constant having value of 8.31451 $JK^{-1}mol^{-1}$, T is the adsorbent column temperature in Kelvin and $V_N$ is the net retention volume per gram of adsorbent and is given by Net retention volume, $V_N/cm^3.g^{-1} = [Ft_R j/(1-p_w/p_o)]T/T_R w_5$ where F is carrier gas flow rate (ml/minute); $t_R$ is corrected retention time (minute); T is the adsorbed column temperature in Kelvin, $p_w$ is water vapor pressure (kPa) at room temperature $T_R$, $p_o$ is column out let pressure (kPa), $W_5$, active weight of the adsorbent present in the column and j is the compressibility correction given by the equation shown below.

Compressibility correction, $j+(3/2)[(p_1/p_o)^2-1)/p_1/p_o)]$ where $p_i$ and $p_o$ are the column inlet and outlet pressures respectively.

Adsorption selectivity $\alpha O_2/Ar = V_N(O_2)/V_N(Ar)$

Heat of adsorption, $-\Delta H_0 = R \, dln(V_N/T)/d(1/T)$

In the formula $-\Delta H_0 = R \, dln(V_N/T)/d(1/T)$ the letter 'd' represents the mathematical operation called 'differentiation' and 1n presents 'natual logarithm'. This can be alternatively written as follows:

$$-\Delta H_o = R \frac{d}{d[1/T]}[\ln(V_N/T)]$$

In fact, $dln(V_N/T)/d(1/T)$ represents the slope of the straight line plotted with 1/T as x-axis and $V_N/T$ as y-axis. T, $V_N$ and R are defined elsewhere in this specification.

The uncertainties in the values of $V_N$, $\alpha O_2/Ar$ and $-\Delta H_0$ as calculated using the method of propagation of errors from the known errors in the experimental parameters were +0.8, +1.6 and +1.8% respectively.

The invention will now be illustrated with the help of typical Examples. It may be understood that the following Examples do not limit the scope of the invention. It is possible to work the invention outside the parameters specified in the following Examples.

EXAMPLE 1

Zeolite NaX powder ($Na_2O:Al_2O_3:2.4SiO_2:w.H_2O$) was prepared by the method described in the U.S. Pat. No. 2,882,244. Water adsorption as given in Table 1 and X-ray diffraction data showed that the starting zeolite powder is highly crystalline. Adsorbent was evaluated for Nitrogen/Oxygen/Argon adsorption capacity and selectivity by elution gas chromatography as per the procedure detailed above. The adsorption data are given in Table 2. The data show that the adsorbent is nitrogen selective $N_2/Ar=3.2$.

EXAMPLE 2

A mixture consisting of 200 g of zeolite powder having chemical composition $NaO:Al_2O_3:2.4SiO_2:w.H_2O$, 50 g of bentonite clay powder and 1 gm of sodium lignosulfonate was ball milled for 1 hour and particles larger than 60 microns were removed by sieving. The ball milled mixture was then hand plugged by adding water. The plugged mass was extruded though a 1.5 mm die by a hand extruder. The extruded adsorbent was first dried at room temperature followed by air oven drying at 110° C. Dried extrudates were calcined at 560° C. in a muffle furnace for 6 hours. Water adsorption given in Table 1 on thus obtained adsorbent particles (NaXE) show that the decrease in adsorption capacity compared to zeolite NaX powder is in proportion to bentonite amount in the adsorbent. X-ray diffraction data also supports the retention of zeolite structure. Adsorbent was evaluated for nitrogen/oxygen/argon adsorption capacity and selectivity by elution gas chromatography. Adsorption data given in Table 2 show that the adsorbent is nitrogen selective. Nitrogen adsorption selectivity of the adsorbent over oxygen and argon are $N_2/O_2=3.3$ and $N_2/Ar=3.5$ respectively.

EXAMPLE 3

NaX powder obtained by the method described in Example-1 was refluxed with 1 wt % aqueous yttrium (III) acetate solution for 48 hours. The zeolite powder was then filtered from the solution and washed with hot distilled water until the wash water was free from chloride. The zeolite powder thus obtained, YXP-1 with a chemical composition of $0.22Na_2O:0.26Y_2O_3:Al_2O_3:2.4SiO_2:w.H_2O$, was dried at 110° C. in an air oven. The zeolite structure was retained after yttrium acetate treatment as all the prominent X-ray diffractions typical of pure zeolite X powder were present. The water equilibrium adsorbent capacity is given in Table 1. Nitrogen/oxygen/argon adsorption capacity and selectivity data measured by elution gas chromatography are given in Table 2. Chromatogram of nitrogen and oxygen mixture eluted from this adsorbent at 30° C. is shown in FIG. 1. The adsorbent possesses very good nitrogen selectivity ($N_2/O_2$=5.8; $N_2/Ar$=6.7) over oxygen or argon.

EXAMPLE 4

Figure 2:
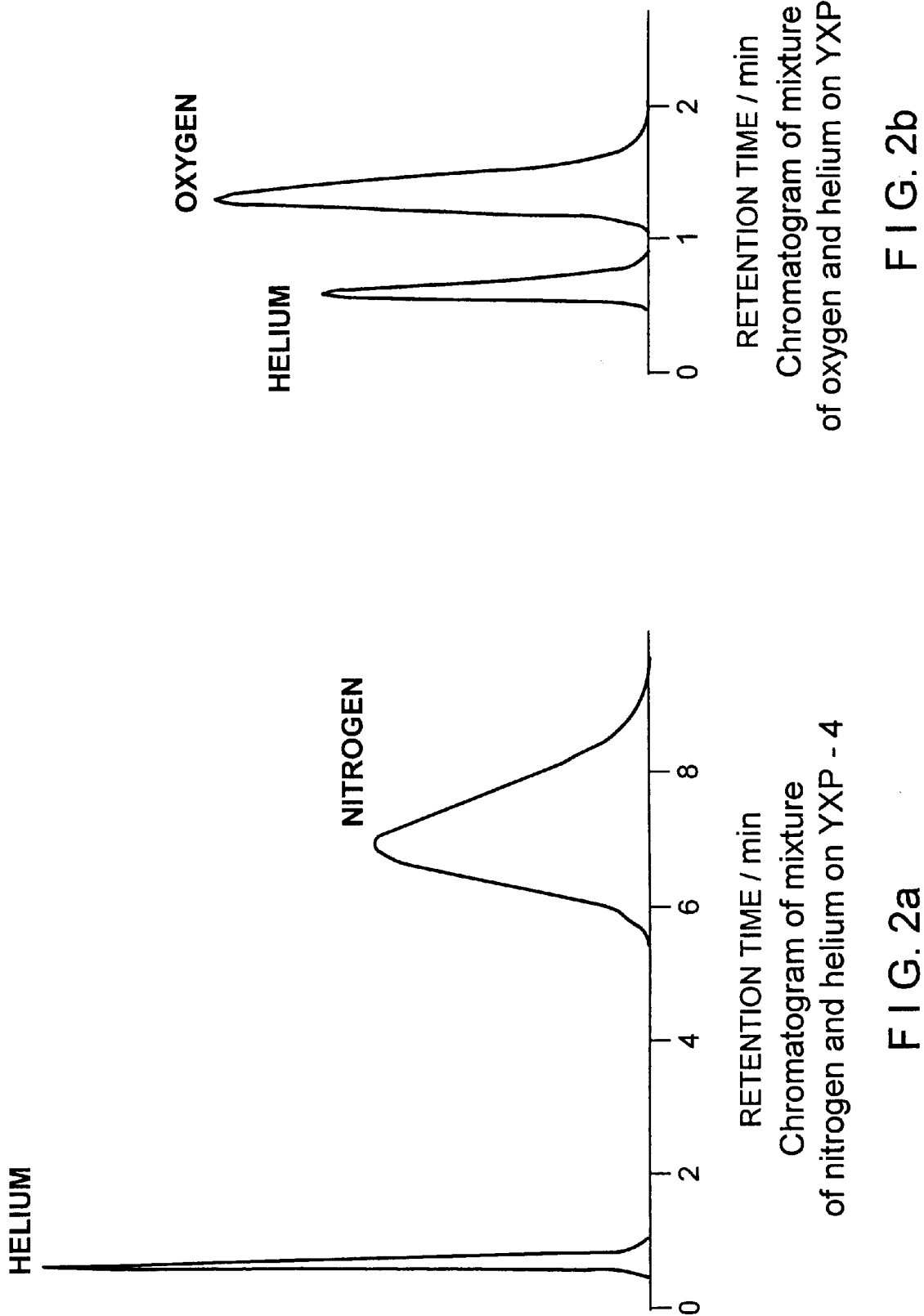
FIG. 2 are chromatograms of mixtures of (a) nitrogen and helium and (b) oxygen and helium on YXP-4.

NaX powder (about 35 g) obtained by the method described in Example-1 was treated at 95° C. in four stages with 1 wt % aqueous solution of yttrium (III) acetate for 48 hours at each stage. The adsorbent was thereafter washed with hot distilled water until the wash water showed the absence of chloride. The adsorbent YXP-4, thus obtained had a chemical composition $0.1Na_2O:0.30Y_2O_3:Al_2O_3:2.4SiO_2:w.H_2O$. The zeolite structure is intact after yttrium acetate treatment as all the prominent x-ray diffractions present in pure zeolite X powder are present. The water equilibrium adsorption capacity is given in Table 1. The adsorption data given in Table 2 shows that adsorbent possesses very good nitrogen selectivity ($N_2/O_2$=8.6; $N_2/Ar$=10.2) over oxygen and argon. Chromatograms of the mixtures of helium and nitrogen and helium and oxygen eluted from this adsorbent at 30° C. are shown in FIG. 2.

EXAMPLE 5

35 g of zeolite NaX adsorbent pellets produced as described by the method in Example-2 were refluxed with 1 wt % aqueous yttrium (III) acetate solution in two stages each for 48 hours. The adsorbent pellets were then filtered from the solution and washed with hot distilled water until the wash water was free from chloride. The adsorbent thus obtained, YXE-1 had a composition $0.16Na_2O:0.28Y_2O_3:Al_2O_3:2.4SiO_2:w.H_2O$. The adsorbent was dried at 110° C. for 6 hours. The zeolite structure was retained after yttrium acetate treatment as all the prominent x-ray diffractions typical of pure zeolite X powder were present. The water equilibrium adsorption capacity is given in Table 1. Nitrogen/oxygen/argon adsorption capacity and selectivity data measured by elution gas chromatography are given in Table 2. The results shown that adsorbent exhibited very good nitrogen selectivity ($N_2/O_2$=8.8; $N_2/Ar$=9.9) from its mixture with oxygen or argon.

EXAMPLE 6

Figure 3:
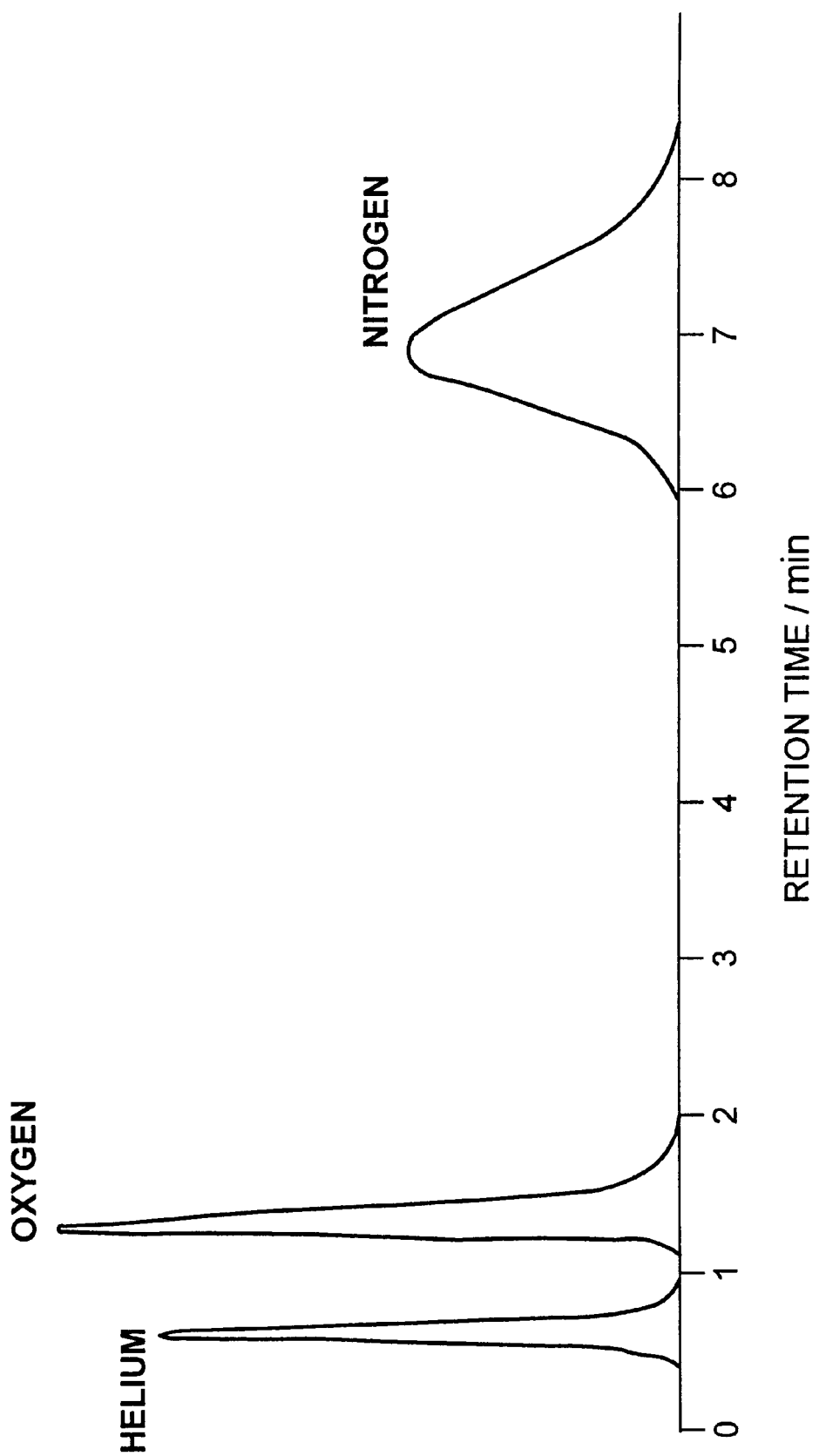
FIG. 3 is a chromatogram of mixture of nitrogen and oxygen on LiYXE.

Zeolite NaX bodies as obtained by the method described in Example-2 were treated with 2.5 wt % of aqueous lithium chloride solution at 90° C. in five stages for 48 hours at each stage. The solution was then decanted and the adsorbent was washed with hot distilled water until the wash water contained no chloride. The adsorbent thus obtained was further treated with 1 wt % yttrium acetate solution using the following procedure. 40 g of the above obtained adsorbent was treated with 1 wt % aqueous solution of yttrium (III) acetate at 95° C. for 48 hours. Then the solution was decanted and the adsorbent washed with hot distilled water three times. The adsorbent was again treated with 1 wt % yttrium acetate solution in a manner similar to that described above. Thereafter the adsorbent was washed with hot distilled water until the wash water showed no traces of chloride. The resultant adsorbent, LiYXE-1 had a composition $0.06Li_2O:0.32Y_2O_3:Al_2O_3:2.4SiO_2:w.H_2O$. The adsorbent was dried at 110° C. in an air oven. The zeolite structure was intact after yttrium acetate treatment as all the prominent diffractions present in pure zeolite X powder were present. The water equilibrium adsorption capacity is given in Table 1. Nitrogen and oxygen adsorption data given in Table 2 shows that adsorbent possesses nitrogen selectivity ($N_2/O_2$=9.1) from its mixture with oxygen. Chromatogram of mixture of nitrogen and oxygen eluted from this adsorbent at 30° C. is shown in FIG. 3.

EXAMPLE 7

40 g of zeolite X bodies as obtained by the method described in Example-2 were treated with 2.5 wt % calcium chloride solution at 90° C. for 48 hours. The solution was then decanted and the adsorbent washed with hot distilled water three times. The adsorbent thus obtained was further treated with 2.5 wt % calcium chloride solution four times in a manner similar to that described above. Thereafter the adsorbent was washed with hot distilled water until the wash water contained no chloride. The resultant adsorbent was further treated with 1 wt % aqueous solution of yttrium acetate solution at 95° C. for 48 hours. Then the solution was decanted and the adsorbent washed with hot distilled water three times. The adsorbent was again treated with 1 wt % yttrium acetate solution in a manner similar to that described above. Thereafter, the adsorbent was washed with hot distilled water until the wash water showed no traces of chloride. The adsorbent thus obtained, CaYXE had a composition $0.24CaO:O0.25Y_2O_3:Al_2O_3:2.4SiO_2:w.H_2O$. The adsorbent was dried at 110° C. in an air oven. The zeolite structure is intact after yttrium acetate treatment as all the prominent x-ray diffractions present in pure zeolite X powder are present. The water equilibrium adsorption capacity is given in Table 1. Nitrogen, oxygen and argon adsorption data given in Table 2 shows that adsorbent possesses nitrogen selectivity ($N_2/O_2$=9.5; $N_2/Ar$=12.1) from its mixture with oxygen or argon. Chromatogram of mixture of nitrogen and oxygen eluted from this adsorbent at 30° C. is given in FIG. 4.

EXAMPLE 8

Zeolite NaY powder ($Na_2O:Al_2O_3:5.4.SiO_2w.H_2O$) was prepared by the method described in U.S. Pat. No. 3,130,007. Water adsorption as given in Table 1 and X-ray diffraction data showed that the starting zeolite powder is highly crystalline. Adsorbent was evaluated for nitrogen, oxygen and argon adsorption capacity and selectivity by elution gas chromatography as per the procedure detailed above. Chromatography of oxygen and nitrogen mixture showed overlap of nitrogen and oxygen peaks indicating incomplete separation of these two gases in the column. Hence, the retention times of nitrogen, oxygen and argon were measured by injecting these gases separately. The adsorption data given in Table 2 show that the adsorbent is nitrogen selective over oxygen ($N_2/O_2$=2.3) and argon $N_2/Ar$=2.4).

EXAMPLE 9

Zeolite NaY powder prepared by the method described earlier was refluxed at 95° C. with 1 wt % aqueous solution of yttrium chloride in two stages for 48 hours at each stage. The solution was thereafter filtered and the solid was washed with hot distilled water until the solution showed the absence of chloride in it. Equilibrium water adsorption capacity is given in Table 1 and X-ray diffraction data show that the zeolite structure is retained after yttrium chloride solution treatment. The elution gas chromatography data of the thus prepared adsorbent, YYP having chemical composition of $0.16.Na_2O:0.28.Y_2O_3:Al_2O_3:5.4.SiO_2:w.H_2O$ is as given in Table 2 show that the adsorbent is nitrogen selective with $N_2/O_2$ and $N_2/Ar$ of 3.0 and 3.1 respectively.

TABLE 1

Oxide formula and equilibrium water adsorption capacity at 30° C. of various adsorbents

| Example | Adsorbent | Equilibrium Water Adsorption at saturation mmol/g of adsorbent |
|---|---|---|
| Example-1 | NaXp | 18.3 |
| Example-2 | NaXE | 14.4 |
| Example-3 | YXP-1 | 12.9 |
| Example-4 | YXP-4 | 12.6 |
| Example-5 | YXE-1 | 11.1 |
| Example-6 | LiYXE | 12.3 |
| Example-7 | CaLiXE | 12.6 |
| Example-8 | NaYP | 15.8 |
| Example-9 | YYP | 11.3 |

TABLE 2

Adsorption data for nitrogen/oxygen gaseous mixture on different adsorbents at 30° C.

| Adsorbent | Henry constant K/mmol · g$^{-1}$kPa$^{-1}$ | | | Adsorption Selectivity, | | Heat of adsorption kJmol$^{-1}$ | | |
|---|---|---|---|---|---|---|---|---|
| | N$_2$ | O$_2$ | Ar | N$_2$/O$_2$ | N$_2$/Ar | N$_2$ | O$_2$ | Ar |
| NaXP | 4.73 | 1.58 | 1.49 | 3.0 | 3.2 | 16.5 | 11.9 | 11.5 |
| NaXE | 3.17 | 0.97 | 0.91 | 3.3 | 3.5 | 18.5 | 12.0 | 11.2 |
| YXP-1 | 4.67 | 0.81 | 0.70 | 5.8 | 6.7 | 27.7 | 14.2 | 12.3 |
| YXP-4 | 8.13 | 0.94 | 0.80 | 8.6 | 10.2 | 30.3 | 14.0 | 12.4 |
| YXE-1 | 7.46 | 0.85 | 0.75 | 8.8 | 9.9 | 29.7 | 13.6 | 12.1 |
| LiYXE | 7.04 | 0.77 | — | 9.1 | — | 31.4 | 12.6 | — |
| CaYXE | 10.72 | 1.12 | 0.89 | 9.5 | 12.1 | 31.5 | 15.0 | 14.0 |
| NaYP | 2.19 | 0.97 | 0.93 | 2.3 | 2.4 | 15.5 | 11.4 | 10.9 |
| YYP | 2.72 | 0.91 | 0.89 | 3.0 | 3.1 | 22.3 | 12.6 | 11.5 |

We claim:

1. A process for preparing a molecular sieve adsorbent for selectively adsorbing nitrogen from a gaseous mixture comprising nitrogen and oxygen; nitrogen and an inert gas or nitrogen, oxygen and an inert gas said process comprising:
   (a) preparing a mixture of zeolite powder, clay and an organic binder, wherein the zeolite powder is prepared from a zeolite of the formula, a.M$_2$O:b.Y$_2$O$_3$:Al$_2$:c.SiO$_2$:w.H$_2$O 

where
   a is from 0.0 to 0.70,
   b is from 0.1 to 0.33,
   c is from 2.0 to 5.5,
   M is alkali earth, alkaline earth or rare earth metal ion, Y represents yttrium and w represents the moles of water;
   (b) shaping said zeolite mixture to obtain adsorbent bodies;
   (c) subjecting said adsorbent bodies to calcination; and
   (d) subjecting said adsorbent bodies either prior to or after calcination or both, to cationic exchange in the presence of a rare earth salt solution to affect surface modification of said adsorbent bodies to obtain said molecular sieve adsorbent.

2. The process as claimed in claim 1, wherein said rare earth salt solution is a salt solution of yttrium or a combination of yttrium with lithium or calcium or a mixture thereof.

3. The process as claimed in claim 1, wherein M is lithium, sodium or calcium.

4. The process as claimed in claim 1, wherein said clay comprises bentonite clay.

5. The process as claimed in claim 1, wherein said clay is an inert clay present in an amount of 2 to 40% by weight.

6. The process as claimed in claim 1, wherein said binder is selected from the group consisting of sodium lignosulfate, starch and polyvinyl alcohol.

7. The process as claimed in claim 1, wherein said zeolite mixture is subjected to ball milling to produce powders of particle size of less than 60 microns.

8. The process as claimed claim 1, wherein the adsorbent bodies are dried at room temperature for about 6 to 12 hrs. followed by oven drying at a temperature of 110° C. for 6 to 18 hrs.

9. The process as claimed in claim 1, wherein said calcination is carried out at a temperature of 450° C. to 700° C.

10. The process as claimed in claim 9, wherein said calcination is carried out for a period of from 2 to 18 hrs.

11. The process as claimed in claim 1, wherein said cation exchange of the adsorbent bodies is carried out at a concentration of cations of 1 to 10% by weight/volume of aqueous solution.

12. The process as claimed in claim 11, wherein said cation exchange is carried out at a temperature of 30 to 100° C. for 4 to 48 hrs.

13. A process as claimed in claim 12 wherein said cation exchanged adsorbent bodies are washed with hot water.

* * * * *